(12) United States Patent
Bi

(10) Patent No.: US 9,945,663 B2
(45) Date of Patent: Apr. 17, 2018

(54) ANTENNA ATTITUDE MEASUREMENT SENSOR AND ANTENNA ATTITUDE MEASUREMENT METHOD

(71) Applicant: Shijie Bi, Beijing (CN)

(72) Inventor: Shijie Bi, Beijing (CN)

( * ) Notice: Subject to any disclaimer, the term of this patent is extended or adjusted under 35 U.S.C. 154(b) by 450 days.

(21) Appl. No.: 14/434,627

(22) PCT Filed: Sep. 30, 2013

(86) PCT No.: PCT/CN2013/084719
§ 371 (c)(1),
(2) Date: Apr. 9, 2015

(87) PCT Pub. No.: WO2014/059881
PCT Pub. Date: Apr. 24, 2014

(65) Prior Publication Data
US 2015/0260513 A1    Sep. 17, 2015

(30) Foreign Application Priority Data

Oct. 18, 2012    (CN) .......................... 2012 1 0396600

(51) Int. Cl.
| | |
|---|---|
| *G01B 21/22* | (2006.01) |
| *G01C 17/34* | (2006.01) |
| *G01S 19/53* | (2010.01) |
| *G01C 21/02* | (2006.01) |
| *G01P 15/00* | (2006.01) |
| *G01S 19/00* | (2010.01) |

(52) U.S. Cl.
CPC ............ *G01B 21/22* (2013.01); *G01C 17/34* (2013.01); *G01C 21/025* (2013.01); *G01P 15/00* (2013.01); *G01S 19/00* (2013.01); *G01S 19/53* (2013.01)

(58) Field of Classification Search
CPC ..................................................... G01B 21/22
See application file for complete search history.

(56) References Cited

U.S. PATENT DOCUMENTS

| 2003/0058161 | A1 | 3/2003 | Ring | |
|---|---|---|---|---|
| 2007/0282529 | A1* | 12/2007 | Thompson | ............ G01C 21/16 701/510 |

FOREIGN PATENT DOCUMENTS

| CN | 101373137 | 6/2010 |
|---|---|---|
| CN | 102692225 | 3/2011 |
| CN | 102032893 | 4/2011 |

(Continued)

*Primary Examiner* — Manuel A Rivera Vargas
(74) *Attorney, Agent, or Firm* — Michael J. Feigin, Esq.; Feigin & Fridman

(57) ABSTRACT

The invention relates to an antenna attitude measurement sensor as well as an attitude measurement method based on this sensor, wherein the antenna attitude measurement sensor is composed of a solar position sensor, a three axial gravity acceleration sensor, a GPS module, a CPU, a power supply module and a memory output module. Antenna attitude measurement method includes the following steps: A. installing antenna attitude measurement sensor; B. acquiring antenna geographic location, antenna hanging height, antenna pitch angle γ and rolling angle θ as well as the incident sunlight azimuth angle φ related to the solar position sensor and the corresponding standard time to form the azimuth angle; C. calculating the vertical incident angle α and level incident angle β; D calculating the antenna azimuth δ; E. memory output.

5 Claims, 2 Drawing Sheets

(56) References Cited

FOREIGN PATENT DOCUMENTS

Figure 1:
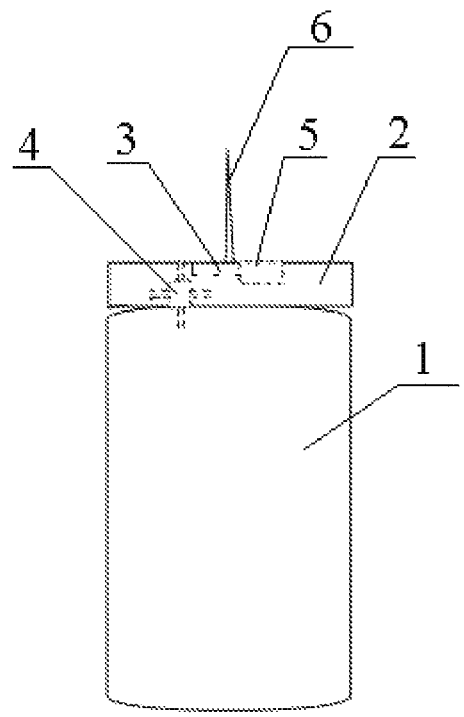

| CN | 201983783 | 9/2011 |
|----|-----------|--------|
| CN | 102401645 | 4/2012 |
| CN | 202255354 | 5/2012 |
| CN | 102901484 | 1/2013 |

* cited by examiner

ANTENNA ATTITUDE MEASUREMENT SENSOR AND ANTENNA ATTITUDE MEASUREMENT METHOD

TECHNICAL FIELD

The invention relates to the communication technical field, which is especially used by a kind of sensor that measures the antenna's attitude in communication network as well as its measurement method.

TECHNICAL BACKGROUND

With the rapid development of the communication technology, the network of domestic wireless communication operators and the number of their users have greatly increased. With the aggravation of the market competition, the quality of the mobile communication network, which has been a powerful guarantee for further developing users and reducing the rate of its users from cutting off its network, has become one of the key factors to determine the competitions among the operators? Factors affecting the quality of the mobile communication network can be mainly divided into three categories: the rationality of network project, the performance quality of network equipments and the construction quality on the spot. Among these three factors, the antenna working parameter data at the base station is the most basic element, and the measurement for the working parameters is the most basic work among its production work for the communication base station's antenna construction, maintenance and optimization. Only based on a complete and reliable working parameter, can the network project and optimization guarantee the quality of the communication network efficient and accurate.

The antenna working parameter data mainly includes azimuth, pitch angle, roll angle, hanging height and its location, etc. Azimuth usually has zero degree angle in the north direction and 180 degree angle in the south direction, which clockwise increases its angle. The antenna azimuth depends on its location and an accurate azimuth can ensure the actual coverage of a base station is accorded with the expected one so as to guarantee its operation quality of the network. The antenna azimuth can be properly adjusted to optimize the existing communication network on the basis of its concrete conditions or network communication traffic. The pitch angle includes depression angle (i.e. declination angle) and elevation angle (i.e. upward elevation angle). The antenna's electromagnetic wave will have a certain coverage field, and its boundary will overlap the other antenna's wave field. Hence, selecting an appropriate pitch angle can make the overlap coverage be reduced to a minimum level so that the signal interference between two adjacent areas can be minimized. If the pitch angle is too small, which can lead to signal overlay and overlap between two neighboring regions, switch confusion between two adjacent coverage areas will occur and signal interference in the system will be serious. If the pitch angle is too big, it will cause signal blind area or weakness zone within the coverage field, and at the same time, it will cause severe distortion of antenna's direction image along with severe signal interference in the system. The roll angle is one of the necessary parameters to describe the space attitude of an object. The traditional antenna working parameters hasn't got roll angles, since the previous testing means was limited and the importance of the rob angle was neglected.

While installing antenna on the base station, try to ensure that the longitudinal section, which goes through the antenna center, will be always perpendicular to the ground. Thus, the antenna roll angle is zero degree. But in fact, due to the restriction of the installation level and later the external force, a considerable proportion of the antenna roll angle has of a large deviation from zero degree. Large non-zero roll angle will cause the electromagnetic wave, which needs to cover a certain direction, to deviate significantly from the expected field, causing the relevant planning leads to an inaccurate optimization. For example, when the antenna slopes, namely, the angle inclination and its longitudinal section are not on the same plane, adding in the roll angle, the antenna space attitude can only be described and the electromagnetic wave specific coverage can be accurately calculated. Antenna attitude measurement is to accurately measure the working parameters of antenna attitude and provide a reliable basis for the network construction.

In the traditional antenna attitude measurement, the workers take use of multiple tools for manual measurement. The antenna azimuth angle is determined artificially through the use of a compass. Since the magnetic lines have got poor consistency, the compass is vulnerably restricted to natural conditions, unable to provide consistent directional measurement. For example, at some point on earth, its declination may be a few degrees to 20 degrees, and the geomagnetic index can be affected by magnetic storms, the minerals on the earth are distributed unevenly. All these factors may cause changes of the north magnetic pole. Generally on the earth, the direction of magnetic lines can be guaranteed consistent only within a few kilometers, but with so many electrical equipments, buildings automobiles and steels in the city, the magnetic field in a small range will change and will be more difficult to compensate. The antenna itself on a base station will send electromagnetic wave of tens of watts. And the base station itself is composed of a large number of steel towers welded together with high density. Accurate compensation at proximal magnetic field can't be obtained with regularity, etc. All these are the factors that initiate the azimuth cannot be precisely measured. The measurement of antenna pitch angle is determined by the working staff who will check the scales marked on the antenna tower. Since the scales have got low precision and the engineers possess different working skills and different measuring methods, it will make the measurement results produce large errors, which will be unable to achieve the requirements for accurate designs.

THE CONTENT OF THE INVENTION

The invention has solved a technical problem, which is to provide a kind of sensor with no magnetic interference and with accurate antenna measurements able to acquire various working parameters data. Based on the sensor, this invention can also provide a kind of antenna attitude measurement method In order to solve the above technical problems, the technical proposal adopted by the invention is as following.

The Antenna attitude measurement sensor, comprising a solar position sensor, a three axial gravity acceleration sensor, a GPS module, a CPU, a power supply module and an memory output module. The input end of CPU is respectively connected with the output ends of the solar position sensor, the three axial gravity acceleration sensor and the GPS module. The output end of CPU is connected with memory output module, and the power supply module is respectively connected with the solar position sensor, the three axial gravity acceleration sensor, GPS module, CPU and the memory output module.

The improvement of this invention lies in that the three axis coordinate system of the solar position sensor has got a translation relation with the three axis coordinate system of the three axial gravity acceleration sensor so that the sunlight incident angle and the attitude sensor, along with the turn angle can be linked together in the calculation formula.

The specific structure of the solar position sensor includes a sundial surface, sundial pointer and the shadow angle sensor of the pointer.

A further improvement of the invention has got the characteristics that the solar position sensor, the three axial gravity acceleration sensor, GPS module, CPU, power supply module and the memory output module are all arranged inside one shell. The position measuring, direction measuring and inclination measuring, as well as the turn angle, all these parameters are implemented by one sensor with multiple functions.

An antenna attitude measurement method. The method is based on antenna attitude measurement sensor. The antenna attitude measurement sensor is composed of a shell and a solar position sensor, a three axial gravity acceleration sensor, GPS module, CPU, power supply module and memory output module, which are arranged inside this shell. The input end of CPU is respectively connected with the output ends of the solar position sensor, the three axial gravity acceleration sensor and GPS module. The output end of CPU is connected with the memory output module. The power supply module is respectively connected with the solar position sensor, the three axial gravity acceleration sensor, GPS module, CPU and the memory output module, the three axis coordinate system of the solar position sensor has got a translation relation with the three axis coordinate system of the three axial gravity acceleration sensor it includes the following steps:

A. The antenna attitude measurement sensor is stably installed on the measured antenna, making the three axis of the attitude measurement sensor keeps parallel with the three axis of the antenna.

B. The GPS module has the function of collecting the antenna's location, its hanging height and the standard time of its corresponding azimuth, and its pitch γ and its roll angle θ can be obtained by three axial gravity acceleration sensor, while the solar position sensor can collect the azimuth angle φ of incident sunlight on the datum plane which is related to the solar position sensor.

C. Based on the GPS module of the antenna attitude measurement sensor, the antenna's location and the standard time can be measured and acquired. Combining with the sun orbit information, the vertical solar incident angle α and horizontal solar incident angle β, which is relative to the local geographic datum, can be derived.

D. According to the data acquired at Step B and Step C, on the basis of the following formula, the antenna's azimuth angle δ can be calculated.

$$\tan(\phi - \theta) = \frac{\sin(\beta - \delta)}{\sin\gamma\tan\alpha + \cos\gamma\cos(\beta - \delta)}$$

E. Repeat Step B to Step U, the optimization result of the antenna working parameter can be measured and acquired and can be stored and output.

This invention has got the following technical progresses.

Combining other attitude measurement information, the invention uses solar light, combining other antenna attitude information to realize the antenna direction measurement because of magnetic interference. This may ensure the accuracy of working reference so as to provide a reliable base for its construction, maintenance and optimization of a communication base station. In the invention, the solar position sensor, the three axial gravity acceleration sensor and the GPS module are all working under the coordination of CPU, which uses the timing function of GPS, combined with the sun orbit information, to analyze and calculate all the information so as to draw all the working parameters of the antenna. In the measurement the artificial action is only performed on fixing the attitude measurement sensor onto the antenna with the same space attitude. Thus, only through one action, can the device complete the measurements of antenna working parameters, which greatly improves the efficiency and accuracy of the project.

INTRODUCTIONS OF THE FIGURES

Figure 2:
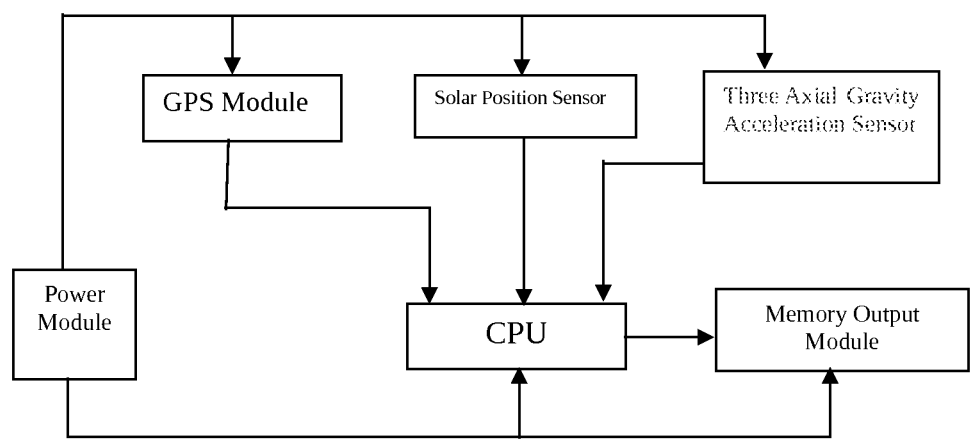
Figure 3:
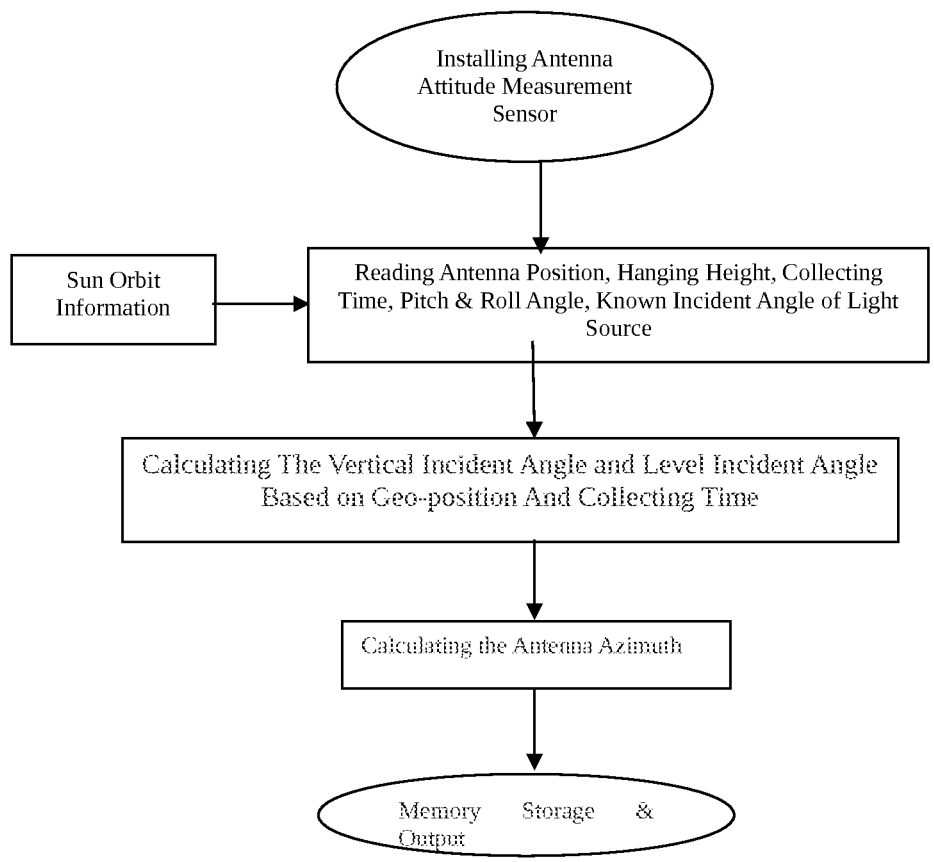

FIG. 1—Installation of the attitude measurement sensor
FIG. 2—Structure Frame of the attitude measurement sensor
FIG. 3—Flow Diagram of the antenna attitude measurement method

DETAILED DESCRIPTION

Among the figures, Num. 1 is the measured antenna, Num. 2 is the shell, Num. 3 is the solar position sensor, Num. 4 is the three axis gravity acceleration sensor, Num. 5 is GPS module, Num. 6 is the sundial pointer.

The specific implementation way is as follows:
Combining all the figures, further details of the invention are described as follows.

An antenna attitude measurement sensor. This attitude measurement sensor mainly comprises a shell Num. 2 and a solar position sensor Num. 3, a three axis gravity acceleration sensor Num. 4, GPS module Num. 5, CPU, a power supply module and a memory output module. The input end of CPU is respectively connected with the output ends of the solar position sensor, the three axial gravity acceleration sensor and GPS module. The power supply module is respectively connected with the solar position sensor, the three axial gravity acceleration sensor, GPS module, CPU, and the memory output module. In the invention, the horizontal level of the solar position sensor is arranged in parallel with the level of the three three axial gravity acceleration sensor. The initial level of zero degree of the three axis gravity acceleration sensor is at the same direction as the zero degree of the solar position sensor. That is, the three axis coordinate system of the solar position sensor has got a translation relation with the three axis coordinate system of the three axial gravity acceleration sensor The solar position sensor includes a sundial surface, a sundial pointer and a shadow angle sensor of the pointer. At some time of the day, the sun shines on the sundial, the sundial pointer will project its shadow on the sundial surface with an angle, which can be read by the shadow angle sensor installed on the sundial surface. Of course, the solar position sensor can also be realized by other means. For example, a camera can be used to take pictures of the shadow on the sundial surface to derive the azimuth angle φ of incident sunlight related to the sundial surface.

An antenna attitude measurement method, based on the above antenna attitude measurement sensor, has got the following steps:

A. Firstly, the antenna attitude measurement sensor is installed on the measured antenna, such as installed on the top of the antenna. The measured antenna and the antenna attitude determination sensors should be fixed as closely as possible to ensure that the three axis coordinate system of the antenna attitude measurement sensor keep parallel with the three axis coordinate system of the antenna.

B. The GPS module has the function of collecting the antenna's location, its hanging height and the standard time of its corresponding azimuth, and its pitch γ and its roll angle θ can be obtained by three axial gravity acceleration sensor, while the solar position sensor can collect the azimuth angle φ of incident sunlight on the datum plane which is related to the solar position sensor. When the solar position sensor reads azimuth angle of the incident sunlight, GPS module will simultaneously records the standard time. The azimuth angle of the incident sunlight refers to sundial pointer's projecting position on the sundial surface while the sunlight shines on the sundial surface of the solar position sensor.

C. Based on the antenna's location and the standard time measured and acquired by GPS module, combining with the sun orbit information, CPU may derive the vertical solar incident angle α and horizontal solar incident angle β, which is relative to the local geographic datum. the vertical solar incident angle α and horizontal solar incident angle β may not be handled by CPU at the local center, these parameters may be transmitted to the central service unit to be calculated through a transmission unit.

D. According to the data acquired at Step B and Step C, on the basis of the following formula, the antenna's azimuth angle δ can be calculated by CPU.

$$\tan(\phi - \theta) = \frac{\sin(\beta - \delta)}{\sin\gamma\tan\alpha + \cos\gamma\cos(\beta - \delta)}$$

E. Repeat Step B to Step D, several groups of the working parameters can be measured and acquired with some certain intervals, while these parameters can be optimized and calculated by CPU.

Of course, at Step A of this invention, the three axis coordinate system of the antenna attitude measurement sensor can be arranged without parallel to the three axis coordinate system of the antenna. That is, it can be set with a fixed bias angle (this angle is based on the original point of the three axis coordinate system and acquired after space rotation). In the final result this bias angle should be eliminated (i.e. reverse rotation angle) to realize the basic working parameters of the antenna.

In the process of antenna attitude measurement, if there is no sunlight while measuring the attitude, the measurement can be performed with the known light position preset manually to achieve the measurement of the antenna. In the use of the known position of a light source, if there is no angle to be realized on the sundial, the known light source can be placed below the sundial, then convert the sundial upside down, the antenna azimuth can be measured. While using the known fixed artificial light source, GPS module may not be synchronously timing while the solar position sensor collects the angle.

The invention can be applied to a one-time engineering survey or can be arranged on the antenna with long term to perform real-time monitor to the antenna attitude. Under the condition of being arranged long-term, or the original base station has obtained an accurate position, GPS module may be replaced by a clock module. Taking use of the synchronous function of the clock module, it will be fine to synchronously record the specific time the angle generates on the sundial.

The invention claimed is:

1. An antenna attitude measurement sensor including:
   a solar position sensor, a three axial gravity acceleration sensor, a GPS module, a CPU, a power supply module and a memory output module, wherein:
   an input end of the CPU is respectively connected with the output ends of the solar position sensor, the three axial gravity acceleration sensor and the GPS module;
   an output end of CPU is connected with the memory output module;
   the power supply module is respectively connected with the solar position sensor, the three axial gravity acceleration sensor, GPS module, the central processor unit (CPU) and the memory output module
   wherein the solar position sensor includes a sundial surface, a sundial pointer and a shadow angle sensor of the pointer.

2. The antenna attitude measurement sensor of claim 1, wherein there is a translation relation between the three axis coordinate system of the solar position sensor and the three axis coordinate system of the three axial gravity acceleration sensor.

3. The antenna attitude measurement sensor of claim 1, wherein the three axial gravity acceleration sensor, GPS module, CPU, power supply module and the memory output module are all arranged inside one shell.

4. A method of using an antenna attitude measurement sensor,
   the antenna attitude measurement sensor comprising:
   a solar position sensor, a three axial gravity acceleration sensor, a GPS module, a CPU, a power supply module and a memory output module, wherein:
   an input end of the CPU is respectively connected with the output ends of the solar position sensor, the three axial gravity acceleration sensor and the GPS module;
   an output end of CPU is connected with the memory output module;
   the power supply module is respectively connected with the solar position sensor, the three axial gravity acceleration sensor, GPS module, the central processor unit (CPU) and the memory output module;
   wherein said method includes the steps of:
   A. installing the antenna attitude measurement sensor on a measured antenna, making the three axis of the attitude measurement sensor parallel with the three axis of the antenna;
   B. using the GPS module to determine the antenna's location, height, the standard time of its corresponding azimuth, and its pitch γ and its roll angle θ in conjunction with use of the three axial gravity acceleration sensor, and further using the solar position sensor to collect the azimuth angle q of incident sunlight on the datum plane which is related to the solar position sensor;
   C. based on the results of step B, the antenna's location and the standard time are measured and acquired and then combined with the solar orbit information, the vertical solar incident angle α and horizontal solar incident angle β are derived;
   D. according to the data acquired at Step B and Step C, on the basis of the following formula, the antenna's azimuth angle δ is calculated;

$$\tan(\phi - \theta) = \frac{\sin(\beta - \delta)}{\sin\gamma\tan\alpha + \cos\gamma\cos(\beta - \delta)}$$

and

E. repeating step B to step D, and obtaining optimized antenna working parameters which are stored and outputted.

5. A method of using an antenna attitude measurement sensor, the antenna attitude measurement sensor comprising:
- a solar position sensor, a three axial gravity acceleration sensor, a GPS module, a CPU, a power supply module and a memory output module, wherein:
- an input end of the CPU is respectively connected with the output ends of the solar position sensor, the three axial gravity acceleration sensor and the GPS module;
- an output end of CPU is connected with the memory output module;
- the power supply module is respectively connected with the solar position sensor, the three axial gravity acceleration sensor, GPS module, the central processor unit (CPU) and the memory output module;

wherein said method includes the steps of:

A. installing the antenna attitude measurement sensor on a measured antenna, making the three axis of the attitude measurement sensor parallel with the three axis of the antenna;

B. using the GPS module to determine the antenna's location, its height and the standard time of its corresponding azimuth in conjunction with the three axial gravity acceleration sensor, and further using the solar position sensor to collect the azimuth angle of incident sunlight on the datum plane;

C. based on the results of step B, the antenna's location and the standard time are measured and acquired and then combined with the solar orbit information, the vertical solar incident angle and horizontal solar incident angle are derived;

D. according to the data acquired at Step B and Step C, calculating the antenna's azimuth angle; and E. repeating step B to step D, and obtaining optimized antenna working parameters which are stored and outputted.

* * * * *